United States Patent [19]

Stack

[11] Patent Number: 4,471,280

[45] Date of Patent: Sep. 11, 1984

[54] ANTI-LOG POWER AMPLIFIER FOR REVERSIBLE D.C. MOTOR IN AUTOMOTIVE STEERING CONTROLS

[75] Inventor: Thomas E. Stack, Troy, Mich.

[73] Assignee: The Bendix Corporation, Southfield, Mich.

[21] Appl. No.: 492,098

[22] Filed: May 6, 1983

[51] Int. Cl.³ .......................................... G05D 17/02
[52] U.S. Cl. .................................... 318/586; 318/256; 318/560; 318/585; 318/628; 244/184; 244/192; 180/79.1
[58] Field of Search ............... 180/79.1, 142; 318/560, 318/628, 585, 586, 255, 256; 244/50, 184, 192

[56] References Cited

U.S. PATENT DOCUMENTS

| | | | |
|---|---|---|---|
| 2,962,108 | 11/1960 | Bidwell | 180/142 |
| 3,011,579 | 12/1961 | Milliken et al. | 180/79.2 |
| 3,521,839 | 7/1970 | Diani | 318/628 X |
| 3,633,701 | 1/1972 | Tourneau | 244/50 X |
| 3,656,043 | 4/1972 | Kawada et al. | 244/192 |
| 3,782,490 | 1/1974 | Schimkat | 180/79.1 |
| 3,821,625 | 6/1974 | Scholl | 244/192 X |
| 3,885,759 | 5/1975 | Lear | 244/50 |
| 3,983,953 | 10/1976 | Bayle | 180/79.1 |
| 3,995,205 | 11/1976 | Klees | 318/588 |
| 4,262,239 | 4/1981 | Kawa | 318/685 X |
| 4,300,650 | 11/1981 | Weber | 180/142 |
| 4,388,570 | 6/1983 | Sangree | 318/255 |
| 4,412,594 | 11/1983 | Funikawa et al. | 180/142 X |

FOREIGN PATENT DOCUMENTS 55-44058 3/1980 Japan ........................ 180/79.1

Primary Examiner—J. V. Truhe
Assistant Examiner—Bentsu Ro
Attorney, Agent, or Firm—James R. Ignatowski; Russel C. Wells

[57] ABSTRACT

An anti-log power amplifier for energizing a reversible electric motor of an electrically assisted power steering system for an automotive vehicle. The power amplifier has a preamplifier which amplifies the output signal of a torque sensor detecting the torque applied to the vehicle's steering wheel, an anti-log signal generator exponentially modifying the amplified output signal, a pulse width modulator converting the exponentially modified signal to a pair of complementary pulse width signals, and a pair of bridged power amplifiers for energizing the reversible electric motor in response to the complementary pulse width signal. The bridged power amplifiers are further responsive to the exponentially modified signal for increasing the electrical power delivered to the reversible electric motor under high torque loads.

35 Claims, 8 Drawing Figures

ANTI-LOG POWER AMPLIFIER FOR REVERSIBLE D.C. MOTOR IN AUTOMOTIVE STEERING CONTROLS

CROSS REFERENCE

The invention is related to co-pending commonly assigned patent application Ser. No. 491,947 entitled "An Electrically Assisted Power Steering Mechanism" filed concurrently herewith on May 6, 1983.

BACKGROUND OF THE INVENTION

1. Field of the Invention

The invention is related to power amplifiers for electric motors and in particular to a power amplifier having an anti-log gain characteristic for activating an electric motor in an automotive electrically assisted power steering mechanism.

2. Prior Art

Power amplifiers capable of controlling the torque output of an electric motor as a function of an input signal are well known in the servo system art. In general the gain characteristics of these power amplifiers are selected to optimize the operation of the servo system as a function of one or more operational parameters. In positioning devices, such as robots or radar antennas, the gain may be a simple function of displacement indicative of distance between the actual and desired positions of the device being moved. Alternatively the gain of the amplifier may be a complex function of the displacement to account for the operational characteristics of the motor, load on the motor, inertial factors, speed of response, positioning accuracy, etc. In most cases, the gain characteristics of the power amplifier are specifically tailored to meet the design objectives of the system.

The present invention is a power amplifier for the electric motor in an electrically assisted power steering mechanism for down sized automotive vehicles. As is known in the art, the primary advantage of electrically or hydraulically assisted steering is when the vehicle is standing or when the driver is executing slow speed maneuvers such as parking. At nominal driving speeds, the requirement for hydraulic or electrical power assist may be eliminated as taught by Turible in U.S. Pat. No. 3,351,152 or reduced or limited as taught by Lear in U.S. Pat. No. 3,885,759, Schimkat in U.S. Pat. No. 3,782,490 or Bayle in U.S. Pat. No. 3,983,953.

The invention is a power amplifier for an electrical assisted power steering mechanism which eliminates the requirement of a vehicle speed input and which eliminates or reduces the authority of the power assistance at nominal and higher vehicle road speeds thereby preserving for the operator what is commonly called "the feel of the road".

SUMMARY OF THE INVENTION

The invention is a power amplifier for the electric motor in an electrically assisted power steering system for an automotive vehicle. A torque sensor generates a torque signal indicative of the magnitude and direction of the torque applied to the vehicle's steering wheel by the operator. The power amplifier comprises a preamplifier for generating an amplified torque signal biased about a reference value, an anti-log signal generator for exponentially modifying the amplified torque signal to generate an exponentially modified torque signal, a pulse width modulator for converting the exponentially modified torque signal into a pair of complementary pulse width signals, and a pair of bridged power amplifiers for energizing the reversible electric motor in response to the complementary pulse width signals. The energized electric motor produces an output torque which is added to the torque applied to the steering wheel at the input to the steering gear mechanism thereby assisting the operator in turning the vehicle's wheels. The bridged amplifiers also include a boost circuit responsive to the value of the torque signal for increasing the electrical power to the motor under full load conditions. The anti-log signal generator may include a dead-band circuit responsive to a torque signal below a predetermined magnitude for holding the output of the anti-log signal generator at the reference value.

The advantage of the power amplifier is that the anti-log characteristics of its power amplification provides the electrically assisted power steering system with little or no power assist under light torque loads as would be encountered at driving speeds yet providing full power assist under high torque loads as would be encountered during parking or low speed maneuvers. Another advantage of the improved power amplifier is that it eliminates the need for a speed input to the amplifier to control the authority of the power steering system under different driving conditions.

These and other advantages of the improved power amplifier will become more apparent when the specification is read in conjunction with the drawings.

DETAILED DESCRIPTION OF THE INVENTION

Figure 1:
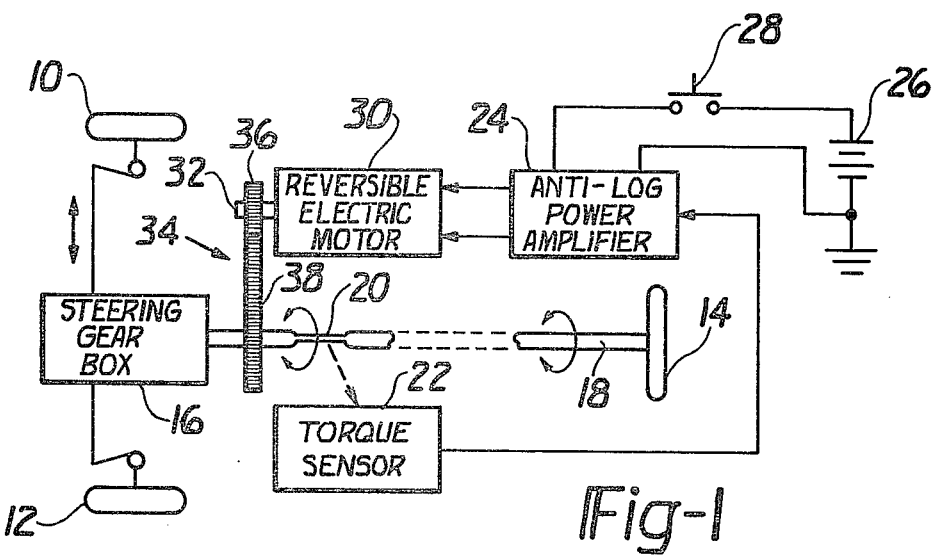
FIG. 1 is a block diagram showing the relationship of the power amplifier to the elements of an electrically assisted power steering system.

Referring to FIG. 1, there is shown the basic elements of an electrical assisted power steering mechanism for an automotive vehicle. The vehicle has a pair of steerable front wheels 10 and 12 mechanically linked to the vehicle's Steering Wheel 14 through Steering Gear Mechanism 16 and Steering Column 18 in a conventional manner. The Steering Column 18 has a resilient Torsion Member, illustrated as necked down portion 20, and an associated Torque Sensor 22 which generates an electrical signal indicative of the torque applied by the operator to the vehicle's Steering Wheel 14. The Torque Sensor 22 may be of any type known in the art, such as a strain gauge attached to Torsion Member 20, a magnetic torque sensor, a mechanical sensor or electro-optical torque sensor detecting the angular displacement of the steering column between the opposite ends of the torsion member 20. The Torque Sensor 22 preferably generates a torque signal having the amplitude or phase component indicative of the magnitude of the applied torque and a polarity component indicative of the direction of the applied torque. The torque signal output from the Torque Sensor 22 is amplified in the Anti-Log Power Amplifier 24 which produces an output signal having a magnitude component which varies as an anti-log function of the amplitude component of the torque signal and a polarity component indicative of the polarity component of the torque signal. The Anti-Log Power amplifier 24 receives electrical power directly from the vehicle's source of electrical power, illustrated as battery 26, through a switch 28 in a conventional manner. It is understood that switch 28 may be the vehicle's ignition switch or a power relay activated in response to turning the ignition switch to the "ON" or "Run" position as is known in the art.

The output signal from the Anti-Log Power Amplifier 24 energizes a Reversible Electric Motor 30 to produce a rotary output on an output shaft 32 having an torque corresponding to the magnitude component of the output signal and a direction of rotation corresponding to polarity component.

The rotary motion of the motor's output shaft 32 is transmitted to the steering column 18 intermediate the Steering Gear Mechanism 16 and the torsion member 20 by a gear train 34. Gear train 34 may comprise two or more gears, such as gears 36 and 38 or may be a more complex arrangement such as the planetary gear drive as shown in copending commonly assigned patent application Ser. No. 491,947.

In operation, the Torque Sensor 22 generates a torque signal indicative of the torque applied to the vehicle's steering wheel 14. The torque signal is amplified in an anti-logrithmic manner in Anti-Log Power Amplifier 24 to generate an output signal energizing the Motor 30 to produce a rotary output. The rotary output of the motor's output shaft 32 is transmitted to the Steering Column 18 producing a torque assisting the vehicle's operator in turning Steering Wheel 14. The torque input to the vehicle's Steering Gear Mechanism 16 is the sum of the torque imparted to the Steering Column 18 by the Motor 30 and its associated gear train 34, plus the torque applied to the Steering Wheel 14 by the vehicle's operator. At nominal or higher vehicle road speeds, where the torque required to correct the vehicles direction of travel is small, the torque generated by the Motor 30 and its associated gear train 34 assisting the operator is negligible due to the anti-log characteristics of Power Amplifier 24. During low speed maneuvers, such as parking or turning corners, the torque applied by the Motor 30 and its associated gear train 34 becomes a significant portion of the total torque required to turn the vehicles wheel.

Figure 2:
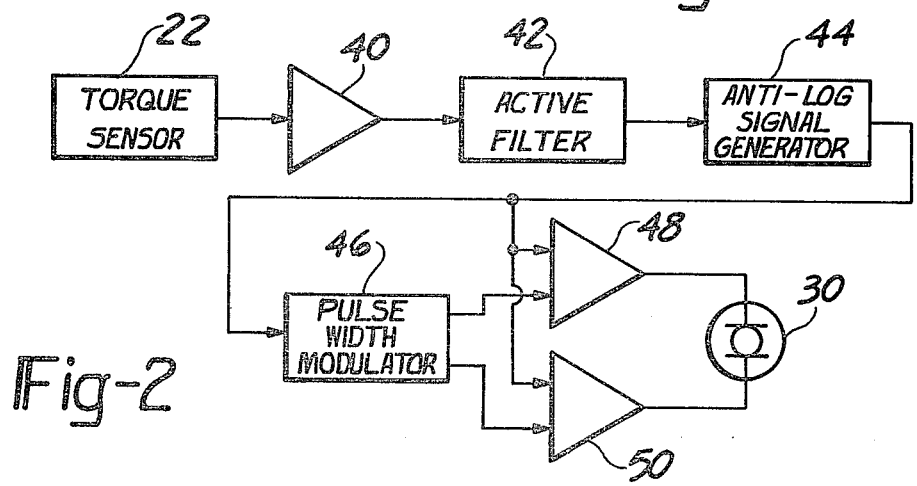
FIG. 2 is a block diagram of the power amplifier.
Figure 5:
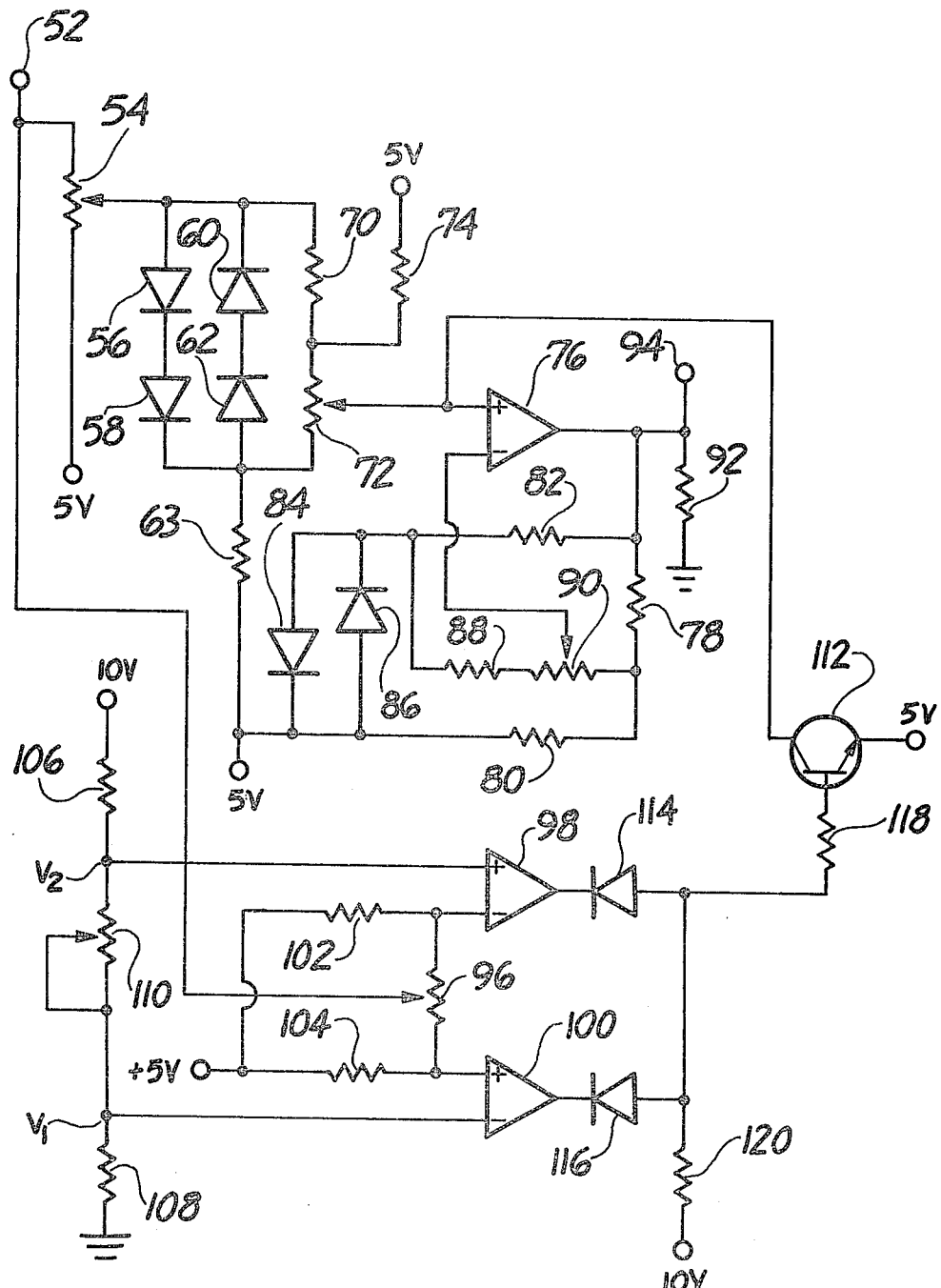
FIG. 5 is a circuit diagram of Anti-Log Signal Generator 44.

FIG. 2 is a block diagram of the Anti-Log Power Amplifier 24 used to energize the Reversible Electric Motor 30 in response to the torque signal generated by the Torque Sensor 22. The torque signal generated by the Torque Sensor 22 is amplified by a Preamplifier 40. The output of the Preamplifier 40 is received by an Active Band Rejection Filter 42. Preferably, Preamplifier 40 biases the amplified torque signal about a predetermined intermediate reference voltage to eliminate the requirement for both positive and negative sources of electrical power. The Active Band Rejection Filter 42 may be one or more of the commercially available active filters known in the art for removing any mechanically or electrically induced resonance signals. The use of the Active Band Rejection Filter 42 is optional and may be eliminated in the absence of objectional resonance signals. The filtered torque signal is received by an Anti-Log Signal Generator 44 where its amplitude of either positive or negative polarity with respect to the reference voltage, is exponentially modified allowing for symmetrical exponential gain. The Anti-Log Signal Generator 44 further includes a "dead band" circuit which limits the response of the signal generator to torque signals having an amplitude of positive or negative polarity greater than a predetermined value as shown on the graph depicted in FIG. 3. The circuit details of the Anti-Log Signal Generator are shown in FIG. 5.

A Pulse Width Modulator 46 converts the exponentially modified torque signal generated by Anti-Log Signal Generator 44 into a pair of complementary pulse width signals having pulse widths indicative of the amplitude of the received exponentially modified torque signal. Pulse Width Modulator 46 may include any of a number of commercially available integrated circuits, such as Switchmode Regulator Control Circuit MC 3420P manufactured by Motorola Corporation. The complementary pulse width signals are individually amplified in a pair of Bridged Power Amplifiers 48 and 50 having their outputs connected to the opposite input terminals of the Reversible Electric Motor 30. The output current capabilities of Bridged Power Amplifiers 48 and 50 being compatible with the current requirements of the Electric Motor 30 under load. The exponentially modified torque signal is also input to the Bridged Power Amplifiers 48 and 50 to further increase their power output capabilities under high load conditions as shall be explained with reference to FIG. 7.

Figure 4:
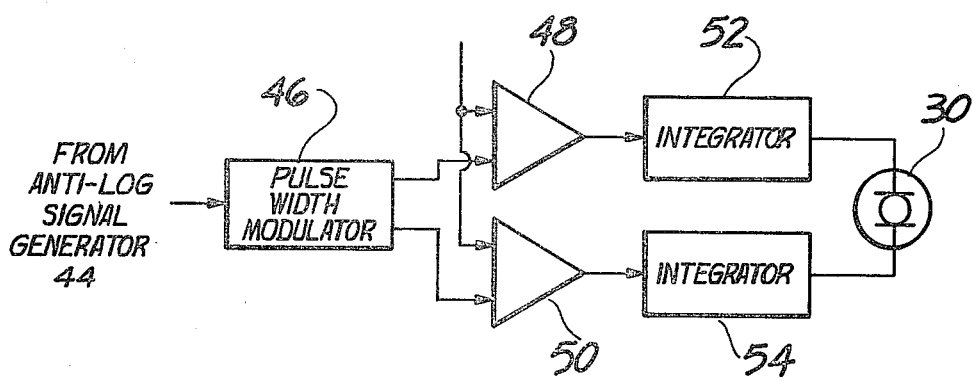
FIG. 4 is a block diagram of an alternate embodiment including Integrators 52 and 54.

In many applications, the inductive and capacitive load of the Electric Motor 30 is sufficient to act as an integrator for the signals output from the Bridged Power Amplifiers 48 and 50 eliminating the requirement for separate integrators at their outputs. If required however, separate integrators, such as Integrators 52 and 54, as shown in FIG. 4 may be inserted between the outputs of Bridged Power Amplifiers 48 and 50 and the electric motor 30.

Figure 3:
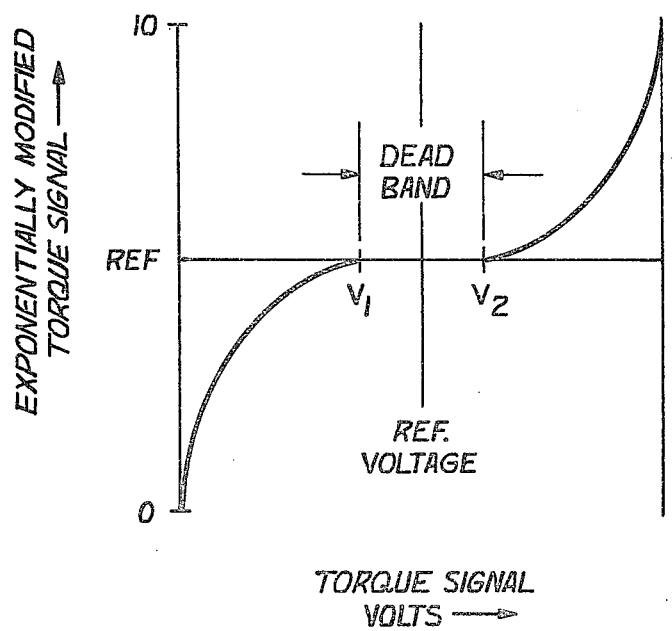
FIG. 3 is a graph showing the signal output characteristics of the Anti-Log Signal Generator 44.

Referring now to FIG. 3, there is shown a graph depicting the output voltage characteristics of the Anti-Log Signal Generator 44 as a function of the amplitude and polarity of the torque signal. As previously described, the Preamplifier 40 biases the torque signal about an intermediate reference voltage which for example would be 5 volts when the electronics are powered from a regulated 10 V electrical power source. For predetermined amplitudes of the torque signal of either polarity, indicated as voltages $V_1$ and $V_2$ respectively, the signal output from the Anti-Log Signal Generator 44 is a constant having a value equal to the reference voltage where the reference voltage is indicative of a zero output torque requirement. A torque signal having a negative polarity and a magnitude greater than the predetermined value will cause an exponential decrease in the output signal of the Anti-Log Signal Generator. Conversely a torque signal having a positive polarity and a magnitude greater than the predetermined value will cause an exponential increase in the output signal of the Anti-Log Signal Generator as shown.

Referring now to FIG. 5 there is shown the details of the Anti-Log Signal Generator 44. The amplified torque signal from either the Preamplifier 40 or when applicable from Active Band Reject Filter 42 is received at an input terminal 52. The input terminal 52 is connected to the reference voltage which is received from a regulated 5 volt power source through a potentiometer 54 and to the slider of a second potentiometer 96 in a "dead band" circuit. The slider of potentionmeter 54 is connected to the anode of a first pair of serially connected diodes 56 and 58 and to the cathode of a second pair of serially connected diodes 60 and 62 connected in parallel with diodes 56 and 58 to the regulated 5 V electrical power source through a resistance 63 as shown. As used herein and in subsequent circuit diagrams the terminals designated 5 V and 10 V are the output terminals of a regulated power source (not shown) while the terminals designated by 12 V represent the output terminals of the vehicle's unregulated source of electrical power, such as battery 26 shown in FIG. 1.

Serially connected resistance 70 and potentiometer 72 are connected in parallel with diodes 56 though 62 with the junction between resistance 70 and potentiometer 72 connected to the 5 volt regulated power source through resistance 74. The slider of potentiometer 72 is connected to the positive input of an operational amplifier 76. The output of operational amplifier 76 is connected to the regulated 5 volt power source through a first voltage divider comprising resistances 78 and 80 and a second voltage divider comprising resistance 82 and diodes 84 and 86. Diodes 84 and 86 are connected in parallel and with reversed polarity between resistance 82 and the regulated 5 volt power source. A resistance 88 and potentiometer 90 are connected in parallel with resistances 78 and 82. The slide of potentiometer 90 is connected to the negative or inverting output to operational amplifier 76. The resistances 78, 80, 82 and 88, diodes 84 and 86 and potentiometer 90 form a feed back network controlling the gain of operational amplifier 76. The output of operational amplifier 76 is also connected to output terminal 94 and to ground through resistance 92.

Referring now to the "dead band" circuit the opposite ends of potentiometer 96 are connected to the negative and positive inputs of operational amplifiers 98 and 100 respectively and to the regulated 5 volt power source through resistances 102 and 104 as shown. A voltage divider comprising serially connected resistances 106 and 108 and variable resistance 110 provides reference voltages, $V_1$ and $V_2$ shown in FIG. 3, to the negative input of operational amplifier 100 and the positive input of operational amplifier 98 respectively. The outputs of operational amplifiers 98 and 100 are connected to the base of transistor 112 through diodes 114 and 116 and resistance 118 and to the regulated 10 volt power source through resistance 120. The collector of transistor 112 is connected to the positive input of operational amplifier 76 and its emitter is connected to the regulated 5 volt power source.

The operation of the Anti-Log Signal Generator is as follows: Operational amplifiers 98 and 100 will generate positive output signals in response to amplified torque signals having a value between $V_1$ and $V_2$ back biasing diodes 114 and 116. Base current is then supplied to the base of transistor 112 from the regulated 10 volt power source through resistances 118 and 120 causing transistor 112 to be conductive. With transistor 112 in the conductive state, the input of operational amplifier 76 is clamped at 5 volts indicative of a zero amplitude torque signal. The values of $V_1$ and $V_2$ are determined by the value of variable resistance 110 which may be fixed by substituting a fixed resistor for variable resistance 110.

An amplified torque signal less than $V_1$ or greater than $V_2$ causes one of the operational amplifiers 98 or 100 to generate a ground signal which shunts the potential at the base of transistor 112 to ground through the associated diode 114 or 116. This causes transistor 112 to become nonconductive removing the 5 volt reference signal from the positive input to operational amplifier 76. Operational amplifier 76 will now be responsive to torque signal present on the slider of potentiometer 72.

By appropriate adjustment of the slider on potentiometer 54, the maximum magnitude of the torque signal applied across serially connected diodes 56 and 58 or 60 and 62, is approximately equal to the minimum saturation voltage of the serially connected diodes. The signal transmitted to the positive input of operational amplifier 76 will therefore vary as the forward turn on characteristics of the diodes, which by nature is exponential. Although the circuit illustrated has two serially connected diodes in each leg, the slope of the exponential response characteristics of the circuit may be varied by changing the number of serially connected diodes and if desired may be made to be different for input signals of different polarities.

Final trimming of the exponential characteristics of the output signal generated by operational amplifier 76 is accomplished by diodes 84 and 86 and potentiometer 90 in the feedback circuit controlling the potential at the negative input of the operational amplifier.

Figure 6:
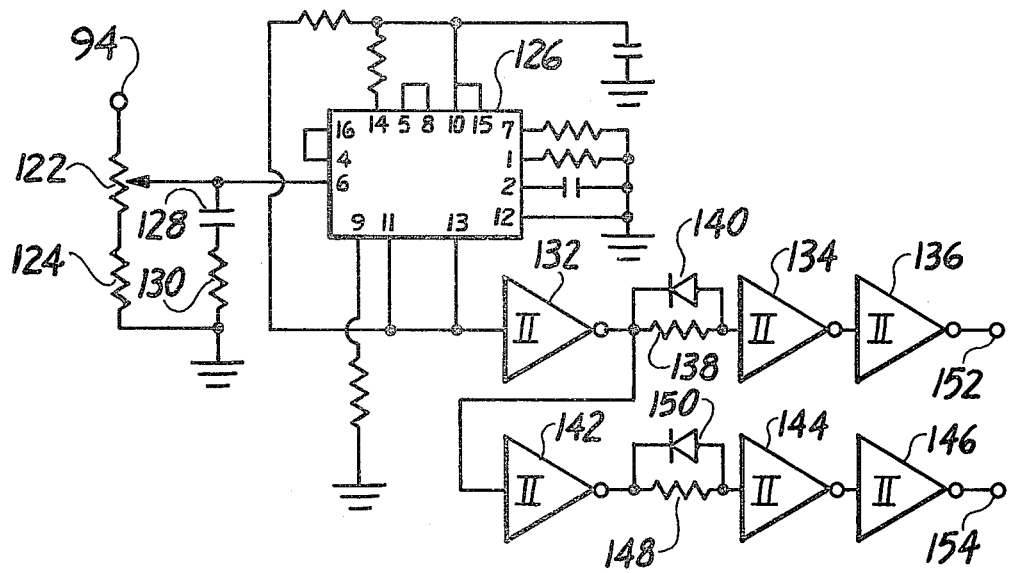
FIG. 6 is a circuit diagram of Pulse Width Modulator 46.

The details of the Pulse Width Modulator 46 are shown on FIG. 6. The output of the Anti-Log Signal Generator 44 designated as terminal 94 is connected to ground through potentiometer 122 and resistance 124. The slider of potentiometer 122 is connected directly to pin 6 of a commercially available integrated circuit 126 such as Switchmode Regulator Control Circuit type MC 3420P manufactured by Motorola which generates a pulse width modulated output signal at pins 11 and 13 at a frequency of about 18k Hertz when connected as shown. The input signal to pin 6 of the integrated circuit 126 is integrated by serially connected capacitance 128 and resistance 130.

The pulse width modulated output of integrated circuit 126 is connected to a first Schmitt trigger 132. The inverted output of Schmitt trigger 132 is connected to serially connect Schmitt trigger 134 and 136 through resistance 138 and diode 140 connected in parallel. The inverted output of Schmitt trigger 132 is also connected to Schmitt trigger 142 whose inverted output is connected to serially connected Schmitt triggers 144 and 146 through resistance 148 and diode 150 connected in parallel. The outputs of Schmitt trigger 136 and 146, appearing at terminals 152 and 154 respectively, are 180° out of phase because of the inversion by Schmitt trigger 142. The six Schmitt triggers 132, 134, 136, 142, 144 and 146 are commercially available in a single integrated circuit package such a Hex Schmitt trigger 74C914 manufactured by National Semiconductor. The function of the serially connected Schmitt triggers is to slightly compress each pulse signal and more sharply define their leading and trailing edges producing a time gap between the rise and fall of the pulses appearing on terminals 152 and 154 of approximately 4 microseconds.

Figure 7:
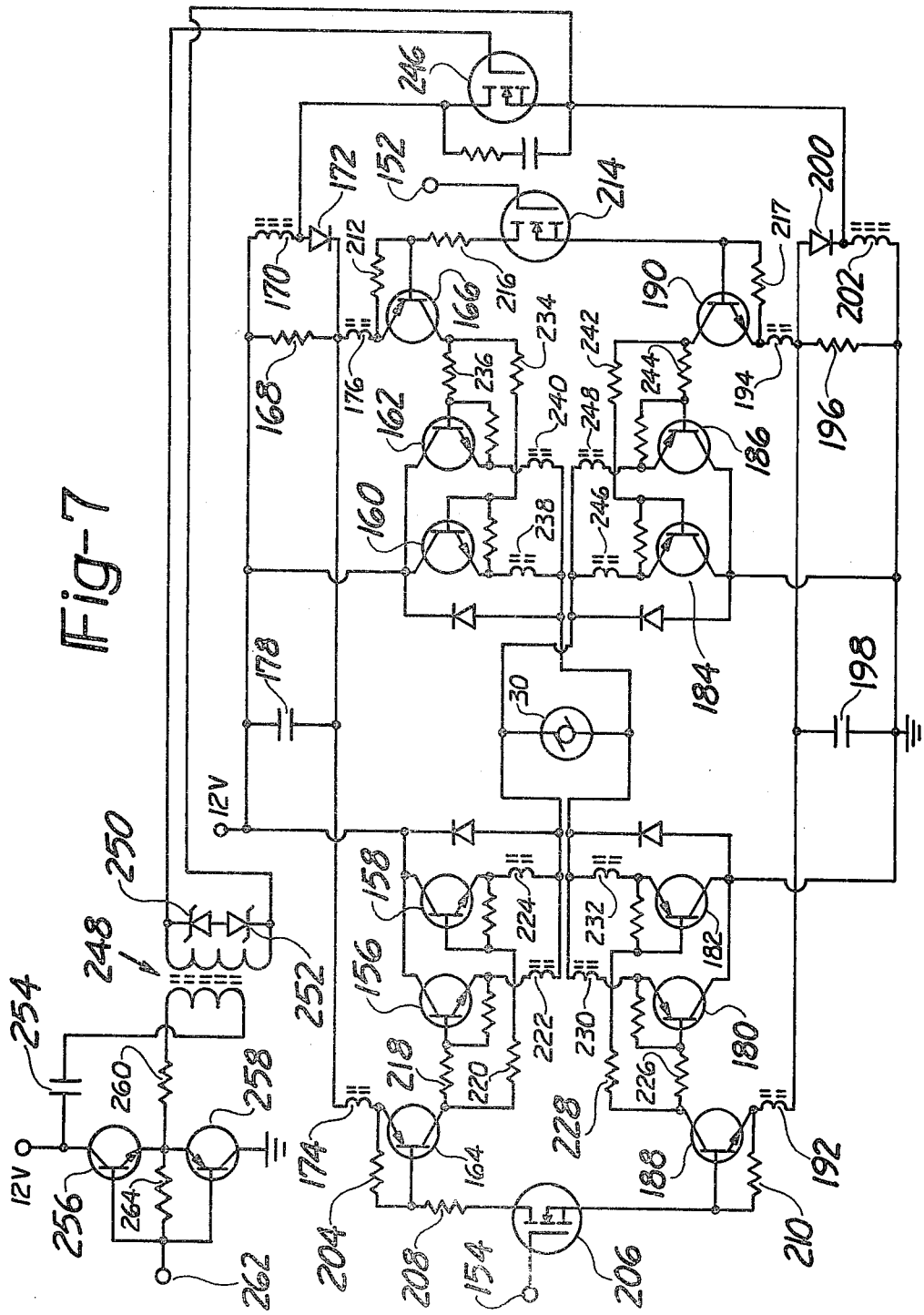
FIG. 7 is a circuit diagram of Bridged Amplifiers 48 and 50.

Referring now to FIG. 7 there is shown the details of Bridged Power Amplifiers 48 and 50. Electrical power from the vehicles unregulated 12 volt power source is connected directly to the collectors of power transistors 156, 158, 160 and 162 and to the emitters of switching transistors 164 and 166 through resistance 168, serially connected inductance 170 and diode 172 connected in parallel with resistance 168 and inductances 174 and 176, respectively. A storage capacitance 178 is also connected in parallel with resistance 168.

In a like manner the collectors of power transistors 180, 182, 184 and 186 are connected directly to ground while the emitters of switching transistors 188 and 190 are connected to ground through inductances 192 and 194 respectively, and resistance 196. Storage capacitance 198 and serially connected diode 200 and inductance 202 are connected in parallel with resistance 196.

The emitter of switching transistor 164 is connected to its base through resistance 204 and to the drain of field effect transistor 206 through serially connected resistances 204 and 208. The source of field effect transistor 206 is connected to the base of transistor 188 and to its emitter through resistance 210. The gate of field effect transistor 206 receives the pulse width signal generated at the output terminal 154 of the Pulse Width Modulator 46.

In a like manner the emitter of switching transistor 166 is connected to its base through resistance 212 and to the drain of field effect transistor 214 through serially connected resistances 212 and 216. The source of field effect transistor 214 is connected directly to the base of switching transistor 190 and to its emitter through resistance 217. The gate of field effect transistor 214 receives the pulse width signals generated at the output terminal 152 of Pulse Width Modulator 46.

The collector of switching transistor 164 is connected to the bases of power transistors 156 and 158 through resistances 218 and 220, respectively. The emitters of power transistors 156 and 158 are connected to one terminal of the electric motor 30 through inductances 222 and 224. In a like manner the collector of switching transistor 188 is connected to the bases of power transistors 180 and 182 through resistances 226 and 228 while the emitters of power transistors 180 and 182 are connected to the other terminal of electric motor 30 through inductances 230 and 232.

The collector of switching transistor 166 is connected to the bases of power transistors 160 and 162 through resistances 234 and 236. The emitters of power transistors 160 and 162 are connected to said other terminal of the electric motor 30 through inductances 238 and 240. In a like manner the collector of switching transistor 190 is connected to the bases of power transistors 184 and 186 through resistances 242 and 244. The emitters of power transistors 184 and 186 connected to said one terminal of the electric motor 30 through inductances 246 and 248.

The drain and source electrodes of field effect transistor 246 are connected to the junctions between inductance 170 and diode 172 and inductance 202 and diode 200, respectively. The gate of transistor 246 is connected to one end of the secondary coil of transformer 248 while the other end of the secondary coil is connected to the source of transistor 246. A pair of back to back zener diodes 250 and 252 limit the maximum voltage that can be applied between the gate and source electrodes of transistor 246.

One end of the primary coil of transformer 248 is connected to the vehicle's 12 V source of electrical power through capacitance 254 while the other end is connected to the emitters of transistors 256 and 258 through a resistance 260. The collector of transistor 256 is connected to the 12 Volt source of electrical power while the collector of transistor 258 is connected to ground. The bases of transistors 256 and 258 are connected to an input terminal 262 which receives a variable pulse width signal from a Variable Pulse Width Oscillator which shall be described hereinafter with respect to FIG. 8. A resistance 264 interconnects terminal 262 with the emitters of transistors 256 and 258.

The operation of the Bridged Amplifier Circuits, 48 and 50 is as follows: Referring to FIG. 7 the pulse width signals from the Pulse Width Modulator 46 are alternatively received at terminals 152 and 154, respectively. The pulse width signal received at terminal 154 activates field effect transistor 206 to provide base current to switching transistors 164 and 188 causing them to conduct. The conductance of switching transistors 164 and 188 simultaneously turns on power transistors 156, 158, 180 and 182 causing a current flow from the vehicle's 12 volt source of electrical power through the electric motor 30 in a first direction for a period of time equal to the duration of the received pulse width signal. After the pulse width signal at terminal 154 is terminated the complementary pulse signal received at terminal 152 turns on field effect transistor 214. In a corresponding manner power transistors 160, 162, 184 and 186 become conductive providing a reverse current flow through the motor 30. Because the frequency of the complementary pulse width signals from the Pulse Width Modulator 46 is higher than the response time of motor 30, the motor only responds to the integrated average of the two alternating and opposing current flows, and will turn in a direction corresponding to the direction of the pulse width signal having the longer pulse width. The 4 microsecond time gap between the pulse width signals generated by the serially connected Schmitt triggers in the Pulse Width Modulator 46, as discussed with reference to FIG. 6, prevent the opposing power transistors from being turned on simultaneously which would otherwise result in a low resistance path to ground burning out the power transistors. The pulse compression allows opposing transistors time to totally turn off to counter the charge delay time phenomenon inherent in minority carrier devices. The event of this condition from occurring is further prevented by the inductances 222, 224, 238, 240, 230, 232, 246 and 248 connected between the power transistors and the motor 30. These inductances further delay the rise in current flow through the motor 30 when the power transistors are turned on. Further, the inherent resistance of these inductors improve the current sharing of the power transistors.

To increase the electrical power to the motor under full load conditions the voltage applied to the bases of the power transistors may be boosted by the voltage boost circuit comprising inductances 170 and 202, diodes 172 and 200, field effect transistor 246 and its associated circuitry. For exponentially modified torque signals below a predetermined value, the Variable Pulse Width Signal Generator shown on FIG. 8 will generate pulse signals having a relatively short duration (0.5 microseconds) which is received at terminal 262. The pulse turns on transistor 256 making it conductive thereby charging capacitor 254 through the primary coil of transformer 248. The secondary coil or transformer 248 will then generate a high voltage signal at the gate of field effect transistor 246 making it conductive thereby substantially increasing the current flow through inductances 170 and 202. At the end of the variable width pulse, transistor 256 is turned off and transistor 258 is turned on discharging capacitance 254 through the primary of transformer 248. The secondary coil of transformer 248 now generates a negative signal at the gate of field effect transistor 246 turning it off. This sharply decreases the current flow through inductances 170 and 202 causing their magnetic fields to collapse. The collapsing magnetic field induces a voltage across inductances 170 and 202 which is added to the 12 volts received from the vehicles unregulated power source. This increased voltage is passed by diode 172 and stored by capacitance 178. For very short pulses, such as the 0.5 microsecond pulses, the induced voltage across inductance 170 is small. Therefore the increased voltage stored by capacitance will be small, (less than 0.5 volts above the unregulated 12 volts). However, for the longer pulse widths, the induced voltage across inductance 170 increases significantly thereby increasing the voltage across capacitance 178 from 2 to 3 volts.

Conversely, the induced voltage across inductance 202 causes capacitance 198 to be charged with a negative potential with respect to ground.

The increased potential across capacitance 178 is applied to bases of power transistor 156 and 158 through switching transistor 164 and to power transistors 160 and 162 through switching transistor 166. In a like manner, the negative potential across capacitance 198 is applied to the bases of power transistors 180 and 182 through switching transistor 188 and the bases of power transistors 184 and 186 through switching transistor 190.

As is known in the art, when the base voltage of npn transistors, such as power transistors 156 through 162, is higher than the collector voltage, the voltage drop across these npn power transistors may be reduced from approximately 1.5 volts to 0.5 volts. Likewise when the base voltage of pnp transistors such as power transistors 180 through 186 is less than the collector voltage, the voltage drop across these pnp power transistor may also be reduced from approximately 1.5 to 0.5 volts. Therefore under high load conditions, indicated by the exponentially modified torque signal exceeding the predetermined value, the width of the pulses generated by the Variable Pulse Width Generator is increased from 0.5 to 3.5 microseconds which increases the voltage applied to the bases of power transistor 156 through 162 by approximately 1.5 volts higher than the voltage applied to their collectors reducing the voltage drop across the power transistors to 0.5 volts. Likewise the voltage applied to the bases of power transistors 180 through 186 is reduced to approximately 1.5 volts below ground potential reducing the voltage drop across these power transistors to 0.5 volts. This effectively increases the voltage applied across the motor 30 from 9 volts to approximately 11 volts thereby increasing the electrical power to motor 30 by about 40 percent under full load conditions when one or the other of the bridged amplifiers 48 or 50 is turned on full time. This also results in less heat generation allowing smaller packaging due to less restrictive heat sink requirements.

Figure 8:
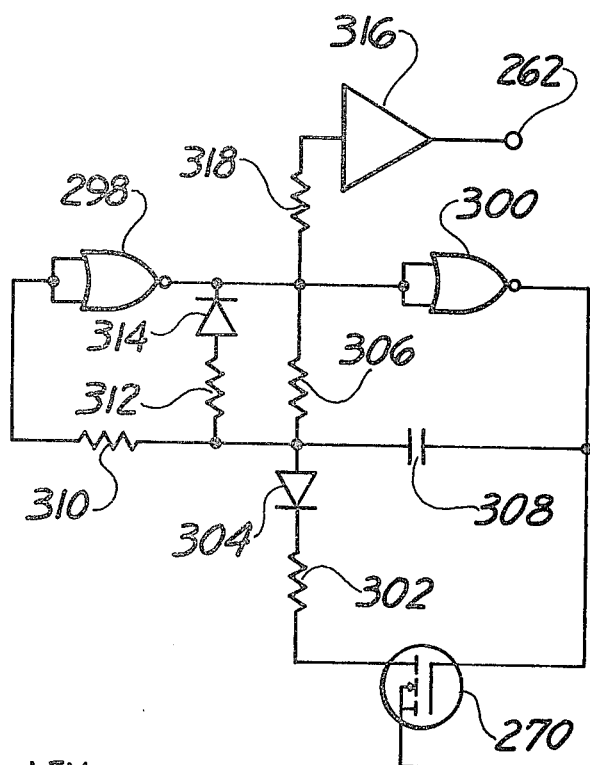
FIG. 8 is a circuit diagram of the Variable Pulse Width Oscillator.
Figure 8:
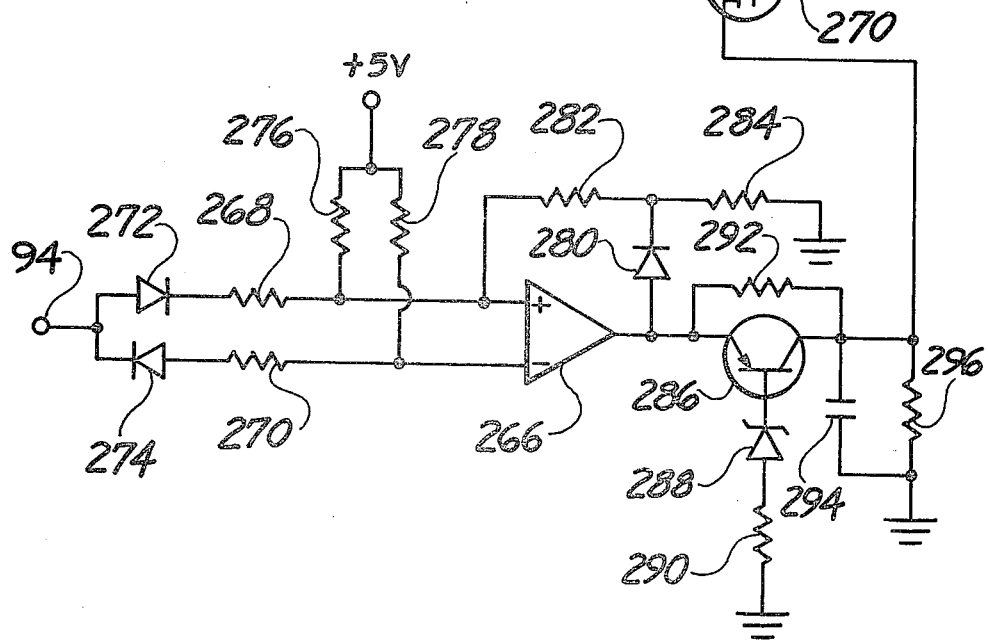

The details of the Variable Pulse Width Generator are shown on FIG. 8. The output from the Anti-Log Signal Generator 44, terminal 94, is connected to the positive and negative inputs of an operational amplifier 266 through resistance 268 and 270 and diodes 272 and 274, respectively. The positive and negative inputs to amplifier 266 are also connected to the regulated 5 volt power source through resistances 276 and 278. The output of amplifier 266 is connected back to its positive input through diode 280 and resistance 282 and to ground through diode 280 and resistance 284. The output of operational amplifier 266 is also connected to emitter of transistor 286 whose base is connected to ground through zener diode 288 and resistance 290. The collector of transistor 286 is connected back to its emitter by resistance 292, to the source of a field effect transistor 270 and to ground through resistance 296. Capacitor 294 is connected in parallel with resistance 296.

The drain of field effect transistor 270 is connected to the output of NOR Gate 298 and to the inputs of NOR Gate 300 through serially connected resistance 302, diode 304 and resistance 306. NOR Gate 300 has its output connected to the gate of field effect transistor 270 and to one electrode of capacitance 308. The other electrode of capacitance 308 is connected to the junction between diode 304 and resistance 306 and from there to the inputs of NOR Gate 298 through resistance 310. Serially connected resistance 312 and diode 314 are connected in parallel with resistance 306. An inverting buffer amplifier 316 has its input connected to the junction between NOR Gates 298 and 300 through resistance 318 and its output connected terminal 262 in the Bridged Power Amplifier Circuit of FIG. 7.

The two NOR Gates 298 and 300, capacitance 308, resistances 306, 310 and 312 and diode 314 comprise an oscillator whose frequency is determined by the size of capacitance 308 and the impedance of its charge path, resistance 306, and its discharge path, comprising resistances 306 and 312 plus diode 314. This oscillator also has a second discharge path comprising serially connected diode 304 and resistances 302 and 296 through field effect transistor 270. Since the gate of transistor 270 is connected to the output of NOR Gate 300 which has a positive potential during the discharge cycle of the capacitance 308, field effect transistor 270 is only activated during the discharge cycle. During the discharge cycle, the output of NOR Gate 298 is a ground potential which is inverted to a positive pulse signal by inverter buffer amplifier 316.

The discharge time of capacitance 308 is controlled by the exponentially modified torque signal received at terminal 94 as follows: A torque signal having a value different from the 5 volt reference signal will produce a signal at the output of amplifier 266 which varies as a function difference between the torque signal and reference signal. When the output signal of operational amplifier 266 is below the turn on value of transistor 286 determined by zener diode 288 a potential is generated at the junction between resistance 292 and 296. This permits capacitance 308 to be discharged through diode 304 and resistance 302 only until its potential is equal to the potential at the junction between resistances 292 and 296. After that the discharge of capacitance 308 is completed through resistances 306 and serially connected resistance 312 and diode 314 lengthening the width of the pulse generated at the output of buffer amplifier 316. For an output signal of amplifier 266 exceeding the turn on threshold of transistor 286, transistor 286 starts to conduct shorting out resistance 292 raising the potential at the junction between resistances 292 and 296 to the full output potential of amplifier 266. This potential back biases diode 304 and capacitance 308 can only discharge through resistance 306 and serially connected resistance 312 and diode 314 lengthening the width of the positive pulse signal generated by buffer amplifier 316.

The values of capacitance 308 and the discharge resistances in the given example were selected to produce a pulse signal having a frequency of about 80k Hertz and producing a minimum pulse width of 0.5 microseconds and a maximum pulse width of 3.5 microseconds. The threshold voltage of transistor 286 being set at approximately 7.4 volts by zener diode 288. As previously discussed relative to the Bridged Power Amplifier Circuit shown on FIG. 7, the variable pulse width signals output from buffer amplifer 316 indicative of full load operating conditions, i.e. exponentially modified torque signals greater than a predetermined value, will increase the voltage applied to the bases of the power transistors. This in turn will substantially increase the electrical power applied to motor 30 thereby increasing its torque output under high load conditions such as during parking and low velocity maneuvers.

It is not intended that the anti-log power amplifier be limited to the specific circuits shown since it is recognized that a person skilled in the art is capable of conceiving other functionally equivalent circuits without departing from the spirit of the invention as described above and set forth in the appended claims:

What is claimed is:

1. In an electric power steering system for an automative vehicle having a source of electrical power, a steering wheel connected to a steering gear mechanism operative to turn the vehicle's steerable wheels, a sensor for generating a torque signal indicative of the magnitude and direction of torque applied by the steering wheel to the steering gear mechanism, a reversible electric motor for producing a torque output added to the torque generated by the steering wheel at the input to the steering gear mechanism to assist in turning the vehicle's wheels, an improved power amplifier for energizing the reversible electric motor in response to said torque signal characterized by:

a preamplifier for amplifying said torque signal to generate an amplified torque signal;

anti-log signal generator means for exponentially modifying said amplified torque signal to generate an exponentially modified torque signal;

pulse width modulator means for pulse width modulating said exponentially modified torque signals to generate a pair of complementary pulse width signals having pulse widths corresponding to the desired direction and magnitude indicated by the exponentially modified torque signal; and a pair of bridged power amplifers responsive to said complementary pulse width signals for energizing the electric motor to produce an output torque corresponding in magnitude and direction indicated by said complementary pulse width signals.

2. The improved power amplifier of claim 1 further including at least one active filter between said preamplifier and anti-log signal generator means for rejecting unwanted resonant frequencies.

3. The improved power amplifier of claim 1 wherein said Preamplifier further includes means for biasing said amplified torque signal about a predetermined reference value.

4. The improved power amplifier of claim 3 wherein said anti-log signal generator includes means for clamping the exponentially modified torque signal at said reference value in response to said amplified torque signal having a magnitude greater than a first value and less than a second value.

5. The improved power amplifier of claim 4 wherein said first and second value are centered about said reference value.

6. The improved power amplifier of claim 3 wherein said anti-log signal generator means comprises:

diode circuit means for exponentially modifying the amplified torque signal, said diode circuit means including at least a first diode having a first polarity with respect to said reference value connected in parallel with a second diode having its polarity reversed with respect to said first polarity, said at least first diode modifying said torque signal having a value greater than said reference signal in accordance with its forward turn-on characteristics and said at least second diode modifying said torque signal having a value less than said reference signal in accordance with its forward turn-on characteristics;

first operational amplifier means having a first input receiving said exponentially modified torque signal, a second input, and an output; and feedback circuit means connected between said second input and said output for generating a feedback signal controlling the gain of said first operational amplifier means.

7. The improved power amplifier of claim 6 wherein said at least one first diodes comprises two serially connected diodes both having said first polarity and said at least one second diode comprises two serially connected diodes both having said reversed polarity.

8. The improved power amplifier of claim 6 or 7 wherein said feedback circuit means further includes at least a third diode having said first polarity and at least a fourth diode connected in parallel with said third diode having its polarity reversed with respect to said first polarity, said third and fourth diodes exponentially modifying said feedback signal to enhance the exponential modification of a torque signal generated by said operational amplifier means different from said reference value.

9. The improved power amplifier of claim 8 further including dead band circuit means for clamping the first input to said operational amplifier means at said reference value in response to said amplified torque signal having a value greater than a first value and less than a second value.

10. The improved power amplifier of claim 9 wherein said dead band circuit means comprises:

a first voltage divider for generating a first signal having said first value and a second signal having said second value;

second operational amplifier means receiving said first signal at its positive input and said amplified torque signal at its negative input for generating a ground signal at its output when the value of said amplified torque signal is less than value of said first signal;

third operational amplifier means receiving said amplified torque signal at its positive input and said second signal at its negative input for generating a ground signal at its output in response to said amplified signal having a value greater than the value of said second signal;

a clamping transistor having its collector connected to the first input of said first operational amplifier means, its emitter connected to said reference value, and a base;

a second voltage divider connected between the base of said transistor and a source of electrical power having a voltage greater than said reference value; and a pair of diodes having their anodes connected to an intermediate input to said second voltage divider, one of said diodes having its cathode connected to the output of said second operational amplifier means and the other diode having its cathode connected to the output of said third operational amplifier means.

11. The improved power amplifier of claims 1 or 2 wherein said pulse width modulator means comprises:

an integrated circuit receiving said exponentially modified torque signal for generating a first pulse signal having pulse widths indicative of the value of said exponentially modified torque signal; and an inverter for inverting said first pulse width signal to generate a second pulse width signal which is the complement of said first pulse width signal, said first and second pulse width signals comprising said pair of complementary pulse width signals.

12. The improved power amplifier of claim 11 further including:

a first pair of serially connected Schmitt triggers for compressing the pulse width of said first pulse width signal by a predetermined factor; and a second pair of serially connected Schmitt triggers for compressing the pulse widths of said second pulse width signals by said same predetermined factor.

13. The improved power amplifier of claims 1 or 2 wherein said pair of bridged power amplifiers comprises:

first power transistor means having an emitter and collector connected between the vehicle's source of electrical power and terminal of the electric motor, and a base;

second power tranistor means having an emitter and collector connected between the other terminal of the electric motor and ground and a base;

first circuit means for applying base current to the bases of said first and second power transistor means in responses to said first pulse width signal;

third power transistor means having an emitter and collector connected between the vehicle's source of electric power and said other terminal of the electric motor, and a base;

fourth power transistor means having an emitter and collector connected between said one terminal of the electric motor and ground, and a base;

second circuit means for applying base current to the bases of said third and fourth power transistor means in response to said second pulse width signal; and boost circuit means for increasing the potential difference between the base and emitter junction of said first, second, third and fourth power transistor means as a function of the value of said torque signal to increase the electrical power being supplied to the electric motor under full load conditions.

14. The improved power amplifier of claim 13 wherein said first and second circuit means comprises:

a first switching transistor having its emitter connected to the vehicle's source of electrical power through a first serially connected inductance and diode, a collector connected to the base of said first power transistor means, and a base connected to the emitter through a first resistance;

a second switching transistor having its emitter connected to ground through a second serially connected inductance and diode, a collector connected to the base of said second power transistor means; and a base connected to the emitter through a second resistance;

a first field effect transistor having its source and drain electrodes interconnecting the bases of said first and second switching transistor, and a gate receiving said first pulse width signal;

a third switching transistor having an emitter connected to the vehicle's source of electrical power through said first serially connected inductance and diode, a collector connected to the base of said third power transistor means, and a base connected to the emitter through a third resistance;

a fourth switching transistor having an emitter connected to ground through said second serially connected inductance and diode, a collector connected to the base of said fourth power transistor means, and a base connected to the emitter through a third resistance;

a second field effect transistor having its source and drain electrodes interconnecting the bases of said third and fourth switching transistors and a gate receiving said second pulse width signal;

a first capacitance connected in parallel with said first serially connected inductance and diode; and a second capacitance connected in parallel with said second serially connected inductance and diode.

15. The improved power amplifier of claim 14 wherein said boost circuit means comprises:

variable pulse width oscillator means responsive to said exponentially modified torque signals for repetitiously generating pulses having a pulse duration increasing as a function of the magnitude of said exponentially modified torque signal; and a third field effect transistor having its source and drain electrodes serially interconnecting the inductances of said first and second serially connected inductances and diodes between the vehicle's source of electrical power, and a gate electrode receiving the pulses generated by said variable pulse width oscillator means.

16. The improved power amplifier of claim 15 wherein said variable pulse width oscillator means comprises:

an oscillator circuit comprising a pair of serially connected NOR gates, charging and discharging a capacitance;

a fourth field effect transistor having a gate connected to the output of one of said NOR gates having a positive signal during the discharge cycle of said capacitance, a source and a drain;

a second discharge path comprising a serially connected diode and resistance connected between one electrode of said capacitance and the drain of said field effect transistor and a resistance connected between the source of said field effect transistor and ground;

fourth operational amplifier means for generating an output signal in response to said exponentially modified torque signal being different from said reference value;

a control transistor having an emitter connected to the output of said fourth operational amplifier, a collector connected to the emitter by a resistance and to the source of said fourth field effect transistor, and a base; and a zener diode connected between the base of said control transistor and ground controlling the turn on potential of said control transistor.

17. The improved power amplifier of claim 13 wherein each of said first and third power transistor means comprise at least two npn power transistors connected in parallel having their collectors connected to the vehicle's source of electrical power and their emitters connected to said one and said other terminals of the electric motor, respectively and wherein said second and fourth transistor means comprises at least two pnp power transistors connected in parallel having their emitters connected to ground and their emitters connected to said other and said one terminals of the electric motor.

18. The improved power amplifier of claim 17 further including an inductance connected between the emitters of said first through fourth power transistor means and the respective terminals of the electric motor.

19. A power amplifier for energizing a reversible electric motor in a servo system having a source of electrical power comprising:

a sensor responsive to at least one operational parameter of the servo system for generating an input signal indicative of the electrical power to be supplied to the electric motor and the desired direction of the motor's output torque;

a preamplifier for amplifying said input signal to generate an amplified signal biased about a reference value;

anti-log signal generator means for exponentially modifying said amplified signal to generate an exponentially modified signal;

pulse width modulator means for pulse width modulating said exponentially modified signal to generate a pair of complementary pulse width signals indicative of the electrical power to be supplied to the electric motor and the direction of its torque output; and a pair of bridged power amplifiers responsive to said complementary pulse width signals for providing electrical power to the electric motor to produce an output torque corresponding to the magnitude and direction indicated by said input signal.

20. The power amplifier of claim 19 further including at least one active filter between said preamplifier and anti-log signal generator means for rejecting unwanted system resonant frequencies.

21. The power amplifier of claim 19 wherein said anti-log signal generator includes means for clamping the exponentially modified signal at said reference value in response to said input signal having a magnitude greater than a first value and less than a second value.

22. The power amplifier of claim 21 wherein said first and second value are centered about said reference value.

23. The improved power amplifier of claim 21 wherein said anti-log signal generator means comprises:

diode circuit means for exponentially modifying the amplified signal, said diode circuit means including at least a first diode having a first polarity with respect to said reference value connected in parallel with a second diode having its polarity reversed with respect to said first polarity, said at least first diode modifying said input signal having a value greater than said reference signal in accordance with its forward turn-on characteristics and said at least second diode modifying said input signal having a value less than said reference signal in accordance with its forward turn-on characteristics;

first operational amplifier means having a first input receiving said exponentially modified signal, a second input, and an output; and feedback circuit means connected between said second input and said output for generating a feedback signal controlling the gain of said first operational amplifier means.

24. The power amplifier of claim 23 wherein said at least one first diodes comprises two serially connected diodes both having said first polarity and said at least one second diode comprises two serially connected diodes both having said reversed polarity.

25. The power amplifier of claim 23 or 24 wherein said feedback circuit means further includes at least a third diode having said first polarity and at least a fourth diode connected in parallel with said third diode having its polarity reversed with respect to said first polarity, said third and fourth diodes exponentially modifying said feedback signal to enhance the exponential modification of a torque signal generated by said operational amplifier means different from said reference value.

26. The power amplifier of claim 25 further including dead band circuit means for clamping the first input to said operational amplifier means at said reference value in response to said amplified signal having a value greater than a first value and less than a second value.

27. The power amplifier of claim 26 wherein said dead band circuit means comprises:

a first voltage divider for generating a first signal having said first value and a second signal having said second value;

second operational amplifier means receiving said first signal at its positive input and said amplified signal at its negative input for generating a ground signal at its output when the value of said amplified signal is less than value of said first signal;

third operational amplifier means receiving said amplified signal at its positive input and said second signal at its negative input for generating a ground signal at its output in response to said amplified signal having a value greater than the value of said second signal;

a clamping transistor having its collector connected to the first input of said first operational amplifier means, its emitter connected to said reference value, and a base;

a second voltage divider connected between the base of said transistor and a source of electrical power having a voltage greater than said reference value; and a pair of diodes having their anodes connected to an intermediate input to said second voltage divider, one of said diodes having its cathode connected to the output of said second operational amplifier means and the other diode having its cathode connected to the output of said third operational amplifier means.

28. The power amplifier of claims 19 wherein said pulse width modulator means comprises:

an integrated circuit receiving said exponentially modified signal for generating a first pulse signal having pulse widths indicative of the value of said exponentially modified signal; and an inverter for inverting said first pulse width signal to generate a second pulse width signal which is the complement of said first pulse width signal, said first and second pulse width signals comprising said pair of complementary pulse width signals.

29. The power amplifier of claim 28 further including:

a first pair of serially connected Schmitt triggers for compressing the pulse width of said first pulse width signal by a predetermined factor; and a second pair of serially connected Schmitt triggers for compressing the pulse widths of said second pulse width signals by said same predetermined factor.

30. The power amplifier of claims 19 wherein said pair of bridged power amplifiers comprises:

first power transistor means having an emitter and collector connected between the source of electrical power and terminal of the electric motor, and a base;

second power transistor means having an emitter and collector connected between the other terminal of the electric motor and ground and a base;

first circuit means for applying base current to the bases of said first and second power transistor means in responses to said first pulse width signal;

third power transistor means having an emitter and collector connected between the vehicle's source of electric power and said other terminal of the electric motor, and a base;

fourth power transistor means having an emitter and collector connected between said one terminal of the electric motor and ground, and a base;

second circuit means for applying base current to the bases of said third and fourth power transistor means in response to said second pulse width signal; and boost circuit means for increasing the potential difference between the base and emitter junction of said first, second, third and fourth power transistor means as a function of the value of said torque signal to increase the electrical power being supplied to the electric motor under full load conditions.

31. The power amplifier of claim 30 wherein said first and second circuit means comprises:

a first switching transistor having its emitter connected to the vehicles source of electrical power through a first serially connected inductance and diode, a collector connected to the base of said first power transistor means, and a base connected to the emitter through a first resistance;

a second switching transistor having its emitter connected to ground through a second serially connected inductance and diode, a collector connected to the base of said second power transistor means; and a base connected to the emitter through a second resistance;

a first field effect transistor having its source and drain electrodes interconnecting the bases of said first and second switching transistor, and a gate receiving said first pulse width signal;

a third switching transistor having an emitter connected to the vehicle's source of electrical power through said first serially connected inductance and diode, a collector connected to the base of said third power transistor means, and a base connected to the emitter through a third resistance;

a fourth switching transistor having an emitter connected to ground through said second serially connected inductance and diode, a collector connected to the base of said fourth power transistor means, and a base connected to the emitter through a third resistance;

a second field effect transistor having its source and drain electrodes interconnecting the bases of said third and fourth switching transistors and a gate receiving said second pulse width signal;

a first capacitance connected in parallel with said first serially connected inductance and diode; and a second capacitance connected in parallel with said second serially connected inductance and diode.

32. The power amplifier of claim 31 wherein said boost circuit means comprises:

variable pulse width oscillator means responsive to said exponentially modified signals for repetitiously generating pulses having a pulse duration increasing as a function of the magnitude of said exponentially modified signal; and a third field effect transistor having its source and drain electrodes serially interconnecting the inductances of said first and second serially connected inductances and diodes between the source of electrical power, and a gate electrode receiving the pulses generated by said variable pulse width oscillator means.

33. The power amplifier of claim 32 wherein said variable pulse width oscillator means comprises:

an oscillator circuit comprising a pair of serially connected NOR gates, charging and discharging a capacitance;

a fourth field effect transistor having a gate connected to the output of one of said NOR gates having a positive signal during the discharge cycle of said capacitance, a source and a drain;

a second discharge path comprising a serially connected diode and resistance connected between one electrode of said capacitance and the drain of said field effect transistor and a resistance connected between the source of said field effect transistor and ground;

fourth operational amplifier means for generating an output signal in response to said exponentially modified signal being different from said reference value;

a control transistor having an emitter connected to the output of said fourth operational amplifier, a collector connected to the emitter by a resistance and to the source of said fourth field effect transistor, and a base; and a zener diode connected between the base of said control transistor and ground controlling the turn on potential of said control transistor.

34. The power amplifier of claim 30 wherein each of said first and third power transistor means comprise at least two npn power transistors connected in parallel having their collectors connected to the source of electrical power and their emitters connected to said one and said other terminals of the electric motor, respectively and wherein said second and fourth transistor means comprises at least two pnp power transistors connected in parallel having their emitters connected to ground and their emitters connected to said other and said one terminals of the electric motor.

35. The power amplifier of claim 34 further including an inductance connected between the emitters of said first through fourth power transistor means and the respective terminals of the electric motor.

* * * * *